US008601173B2

(12) United States Patent
Sung et al.

(10) Patent No.: US 8,601,173 B2
(45) Date of Patent: Dec. 3, 2013

(54) DETECTION OF CABLE CONNECTIONS FOR ELECTRONIC DEVICES

(75) Inventors: Baegin Sung, Sunnyvale, CA (US); MyounHwan Kim, Yongin-si (KR); Gyudong Kim, Sunnyvale, CA (US); Chandlee Harrell, Los Altos, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 163 days.

(21) Appl. No.: 13/172,742

(22) Filed: Jun. 29, 2011

(65) Prior Publication Data

US 2012/0003863 A1 Jan. 5, 2012

Related U.S. Application Data (60) Provisional application No. 61/360,428, filed on Jun. 30, 2010.

(51) Int. Cl.
*G06F 3/00* (2006.01)
*G06F 13/12* (2006.01)

(52) U.S. Cl.
USPC .................................. 710/15; 710/11; 710/62

(58) Field of Classification Search
USPC .................. 710/11–12, 15–19, 62–64, 72–74
See application file for complete search history.

(56) References Cited

U.S. PATENT DOCUMENTS

| 5,081,701 | A | 1/1992 | Silver | |
|---|---|---|---|---|
| 6,658,497 | B1 | 12/2003 | Kawasaki et al. | |
| 7,788,428 | B2* | 8/2010 | Melin | 710/62 |
| 7,865,629 | B1* | 1/2011 | Tantos et al. | 710/11 |
| 8,176,214 | B2* | 5/2012 | Jones et al. | 710/14 |
| 8,275,914 | B2* | 9/2012 | Kim et al. | 710/15 |
| 2006/0146485 | A1 | 7/2006 | Stancil | |
| 2009/0177818 | A1 | 7/2009 | Shim et al. | |
| 2009/0248924 | A1* | 10/2009 | Melin | 710/63 |
| 2010/0100200 | A1* | 4/2010 | Kim et al. | 700/12 |
| 2010/0104029 | A1* | 4/2010 | Lee et al. | 375/257 |
| 2010/0109795 | A1* | 5/2010 | Jones et al. | 333/101 |
| 2010/0132001 | A1* | 5/2010 | Kitano et al. | 725/118 |
| 2011/0125930 | A1* | 5/2011 | Tantos et al. | 710/8 |
| 2011/0126005 | A1* | 5/2011 | Carpenter et al. | 713/158 |
| 2011/0246796 | A1* | 10/2011 | Komori | 713/300 |
| 2012/0005377 | A1* | 1/2012 | Kim et al. | 710/16 |
| 2012/0173776 | A1* | 7/2012 | Jones | 710/65 |
| 2012/0297207 | A1* | 11/2012 | Carlsen et al. | 713/300 |
| 2013/0014199 | A1* | 1/2013 | Horan et al. | 725/127 |

OTHER PUBLICATIONS

International Search Report and Written Opinion from PCT/US2011/042616 mailed Feb. 24, 2012, 7 pages.
"High-Definition Multimedia Interface Specification Version 1.3," HDMI Licensing, LLC, Jun. 22, 2006, 237 pages.
"Universal Serial Bus Micro-USB Cables and Connectors Specification, Revision 1.01," Apr. 4, 2007, 36 pages.

\* cited by examiner

*Primary Examiner* — Christopher Shin
(74) *Attorney, Agent, or Firm* — Blakely Sokoloff Taylor Zafman LLP (57) ABSTRACT

Embodiments of the invention are generally directed to detection of cable connections for electronic devices. An embodiment of an apparatus includes a port for the connection of a cable, the port being compatible with a first protocol and a second protocol, the port including a connector for the second protocol, the port including multiple pins including a first pin and a second pin. The apparatus further includes a pull-up resistor coupled between the first pin and a voltage source, a pull-down resistor coupled between the second pin and ground, and a voltage detection element coupled with the second pin. The apparatus is to determine that a cable compatible with the first protocol is connected to the port if the voltage detection element detects a voltage above a first threshold.

22 Claims, 7 Drawing Sheets

| Contact Number | MHL Name |
|---|---|
| 1 | VBUS |
| 2 | MHL- |
| 3 | MHL+ |
| 4 | CBUS |
| 5 | GND |
| Shell | Shield |

Fig. 5A

| Contact Number | MHL Name |
|---|---|
| 1 | N/C |
| 2 | CD_SENSE |
| 3 | N/C |
| 4 | N/C |
| 5 | TMDS_GND |
| 6 | N/C |
| 7 | MHL+ |
| 8 | MHL_Shield |
| 9 | MHL- |
| 10 | N/C |
| 11 | TMDS_GND |
| 12 | N/C |
| 13 | N/C |
| 14 | N/C |
| 15 | CD_PULLUP |
| 16 | N/C |
| 17 | VBUS_CBUS_GND |
| 18 | VBUS |
| 19 | CBUS |
| Shell | Shield |

Fig. 5B

| Item | Symbol | Min | Typ | Max | Unit |
|---|---|---|---|---|---|
| Cable Detect Pull-up Resistor | $R_{PULL\_UP\_TYPE\_A\_REC}$ | 42.3k | 47k | 51.7k | ohms |
| Cable Detect Pull-down Resistor | $R_{CABLE\_DETECT\_TYPE\_A\_REC}$ | 270k | 300k | 330k | ohms |
| Cable Detect Pull-down Capacitor | $C_{CABLE\_DETECT\_TYPE\_A\_REC}$ | 42.3 | 47 | | nF |
| Termination Voltage | $V_{TERM\_CABLE\_DETECT\_TYPE\_A}$ | 2.97 | | 5.3 | V |
| Detection Input High Voltage | $V_{CABLE\_DETECT\_IH\_TYPE\_A}$ | 2.0 | | | V |
| Detection Input Low Voltage | $V_{CABLE\_DETECT\_IL\_TYPE\_A}$ | | | 0.8 | V |

Fig. 6A

| Item | Symbol | Min | Typ | Max | Unit |
|---|---|---|---|---|---|
| Cable Detect Plug Resistor | $R_{CABLE\_DETECT\_TYPE\_A\_PLUG}$ | 2.97 | 3.3 | 3.63 | Kohms |

DETECTION OF CABLE CONNECTIONS FOR ELECTRONIC DEVICES

RELATED APPLICATIONS

This application is related to and claims priority to U.S. Provisional Patent Application No. 61/360,428, filed Jun. 30, 2010, and such application is incorporated herein by reference.

TECHNICAL FIELD

Embodiments of the invention generally relate to the field of electronic devices and, more particularly, to detection of cable connections for electronic devices.

BACKGROUND

As the capabilities and functions of electronic devices, and in particular mobile devices, have proliferated, there are more situations in which such devices may be connected together. Such devices may be connected together via a cable to provide various functions.

For example, a mobile device may be connected via a cable with a device in order to present data. The mobile device may contain data, such as high-definition video data, for display, and the mobile device thus may be connected to a television or other device for the purpose of displaying the data on the device.

However, there are numerous different connection protocols that may related to a device such as a television, resulting in a confusing variety of ports and connectors installed in display systems.

It is possible to utilize a connector for multiple purposes in order to minimize the number of connectors needed. However, but this may result in complications in certain circumstances. Identification of the type of device attached to an opposite end of a cable is generally required, which may result in problems if expected signals are not received. If there is difficulty in identification of connected devices, the use of pins or connections for multiple different purposes for a connector may result in the application of improper signal to devices, which may create errors or, in certain circumstances, potential damage to a device.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to detection of cable connections for electronic devices.

In a first aspect of the invention, an embodiment of an apparatus includes a port for the connection of a cable, the port being compatible with a first protocol and a second protocol, the port including a connector for the second protocol, the port including multiple pins including a first pin and a second pin. The apparatus further includes a pull-up resistor coupled between the first pin and a voltage source, a pull-down resistor coupled between the second pin and ground, and a voltage detection element coupled with the second pin. The apparatus is to determine that a cable compatible with the first protocol is connected to the port if the voltage detection element detects a voltage above a first threshold.

In a second aspect of the invention, an embodiment of a system includes a sink device that is compatible with a first protocol and a second protocol, the sink device including a port having a connector for the second protocol, the port including multiple pins including a first pin and a second pin, a pull-up resistor coupled between the first pin and a voltage source, a pull-down resistor coupled between the second pin and ground, and a voltage detection element coupled with the second pin. The system further includes a cable coupled with the sink device, the cable including a connector for the second protocol, the connector including a first pin to connect with the first pin of the port and a second pin to connect with the second pin of the port, the cable including a resistor between the first pin of the cable connector and the second pin of the cable connector. The sink device is to determine that the cable is compatible with the first protocol if the voltage detection element detects a voltage above a first threshold.

In a third aspect of the invention, an embodiment of a method includes connecting a first pin of a connector of a device to a first end of a pull-up resistor, a second end of the pull-up resistor being coupled with a voltage source, the device being compatible with a first protocol and a second protocol, the pull-up resistor being required for the second protocol. The method further includes connecting a second pin of the connector of the device to a first end of a pull-down resistor and a node, a second end of the pull-down resistor being coupled with ground, and detecting a voltage on the node. The method includes determining by the device that a cable compatible with the first protocol is coupled with the connector if the detected voltage is above a threshold voltage.

DETAILED DESCRIPTION

Embodiments of the invention are generally directed to detection of cable connections for electronic devices.

In some embodiments, a receiving device, or sink device, operates to identify a type of cable for a transmitting device, or source device, attached to the sink device via a cable connection. In some embodiments, the cable may be connected to a port of the sink device that is reused for multiple protocols. In some embodiments, the sink device is able to detect the type of cable connection even if, for example, the source device has insufficient power and thus cannot provide signaling for a discovery sequence that is normally used to identify the sink device.

Data source devices may provide data in utilizing various protocols. In an example, a device may provide video data, and in particular high-definition video data, using certain protocols, including HDMI™ (High Definition Multimedia Interface) (HDMI 1.4 Specification, issued May 28, 2009) and MHL™ (Mobile High-Definition Link) (MHL 1.0 Specification, issued Jun. 30, 2010) data protocols. MHL is an interface protocol that provides for connection of a mobile device to an HDMI display device. MHL shares a connector with USB (Universal Serial Bus) at the mobile side and shares a connector with HDMI at the display side. In this manner, neither a mobile device nor a display device requires an additional new connector to support MHL.

However, in operation a display device is required to determine the nature of a connected source device, such as whether the source device is an HDMI source, an MHL source, or a USB device that is erroneously connected to an MHL/HDMI cable. In the interconnection of a source device to a device such as a dual-mode MHL/HDMI compatible sink, identifying the type of source device from the sink device side is important because of the state of a pin that may receive power from one of the connected devices (the pin being referred to here as the power pin). For MHL operation, power is provided by an MHL sink device to an MHL source device on the power pin. In contrast with the MHL protocol requirements, a voltage is supplied on the power pin in the reverse direction in an HDMI connection, from the HDMI source device to a connected HDMI sink device. The provision of the power signal from the MHL sink device to the MHL source device enables the sink device (being a display device) to provide power to charge the battery of the source device (being a mobile device that is generally running on battery power).

However, a battery drained mobile device cannot initiate the discovery sequence provided for MHL protocol, and a successful discovery sequence is necessary for subsequent MHL operations. In some embodiments, if a sink device can identify a cable connection (and thus a discharged source device), it is possible to charge the source unit without the requirement of proceeding through the discovery sequence. If a sink device were instead designed such that power was available all times, then the source device would not need to be identified. However, this implementation would create certain complications, including:

(1) The constant provision of power increases the stand-by power requirements of the display device.

(2) Because of the sharing of MHL and HDMI connectors at the sink device end, the provision of power on the power pin creates a power conflict when the display device is connected with a legacy HDMI source device, which would normally supply power on this pin.

In some embodiments, a mechanism operates to detect a cable connection of a certain protocol. In some embodiments, a detection mechanism may include a sink device compatible with a first interface protocol (MHL) compatible sink and a second interface protocol (HDMI), and a cable connect mechanism with a connector for the second protocol (such as an HDMI Type A connector), where the sink device operates to sense a voltage that is generated using a pull-up resistor and voltage required for the second protocol.

In some embodiments, in a system for detection of a cable connected to an sink device, if a voltage on a sense pin (CD_SENSE) of a connector receptacle is less than or equal to a lower threshold voltage, then the sink device determines that no first protocol (such as MHL) cable is attached. If the voltage on the sense pin of the receptacle is greater than or equal to a higher threshold voltage, then the sink device determines that the cable is attached.

In some embodiments, the sensing operation determines whether there is an MHL cable is attached to a sink device, where the sink device is compatible with MHL and HDMI. However, embodiments are not limited to any particular kind of cable. In some embodiments, resistor levels may be modified to detect more than one type of cable.

In some embodiments, a cable has a certain resistance (such as 3 KΩ) added between two pins, where such resistance is small enough so as not to affect the sensing voltage, the resistance value being significantly smaller than a value of, for example, 47 KΩ (which is a required value for an HDMI compatible device) and 300 KΩ, but large enough that, if there a connection to a device (such as an HDMI device) that is pulled to ground, the resistance may provide protection for the short to ground. In some embodiments, resistance values may be selected for easy manufacture, but this is not necessary. In some embodiments, the cable resistance may be modified for different implementations.

Figure 1:
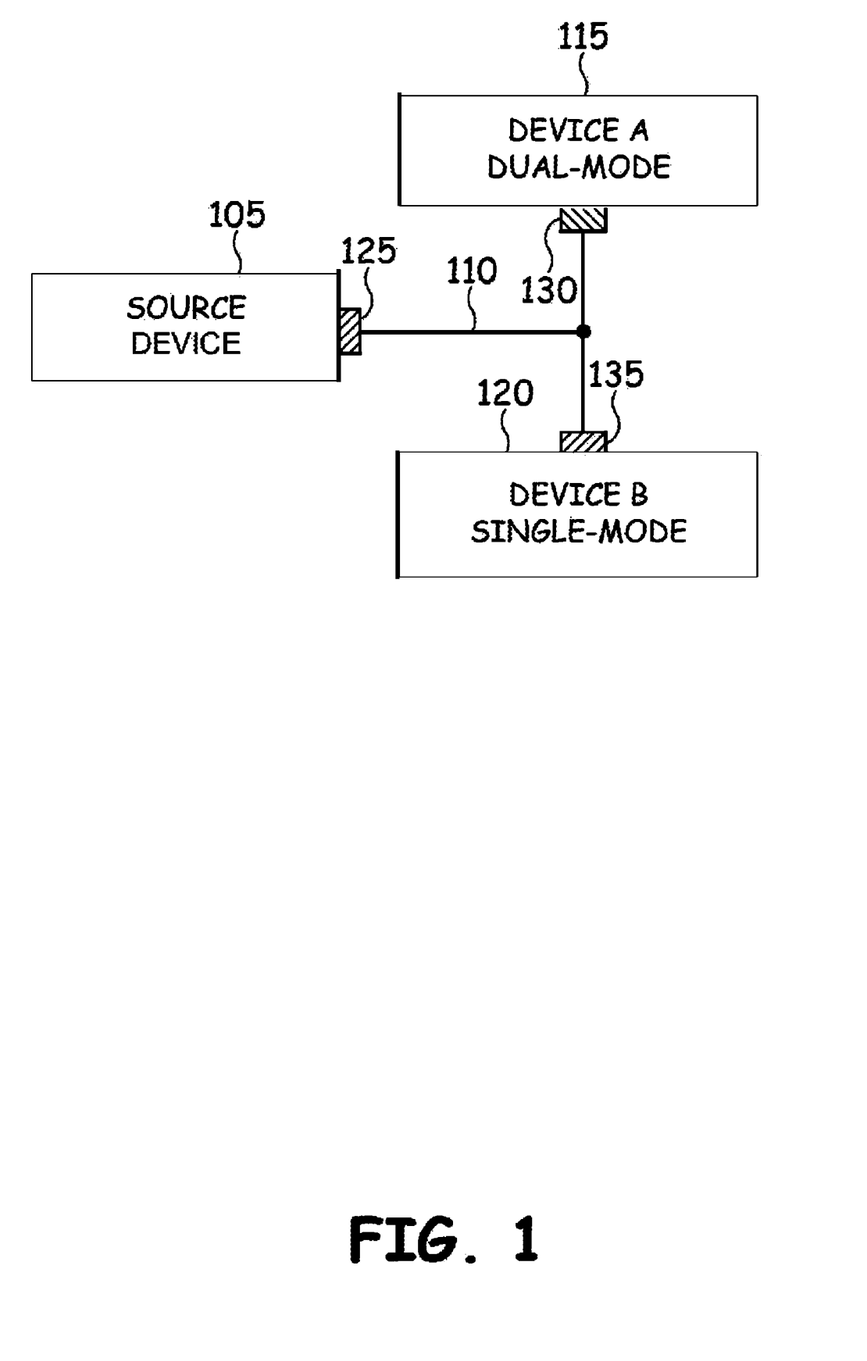
FIG. 1 is an illustration of an embodiment of detection of possible cable connections between devices.

FIG. 1 is an illustration of an embodiment of detection of possible cable connections between devices. In some embodiments, a data source device such as a source device 105 is connected via a cable 110 to a data sink device. In some embodiments, the cable 110 utilizes connectors for ports that reused for multiple protocols. For example, the port at the source device end 125 may be an MHL port, which is a reused USB port. Further, the port at the sink end of the cable 110 could be an HDMI port, such as port 135 of Device B 120, a single-mode HDMI device, or an MHL port, such as port 130 of Device A 115, a dual-mode HDMI/MHL device. (While FIG. 1 illustrates device 105 as being connected to Device A and Device B, this is intended as an alternative, and not an indication that device 105 is connected to both simultaneously.)

In this illustration, if the cable is connected to Device A 115, then it is not apparent simply from the connection of the cable what type of device the source device 105 might be. The source device could be an HDMI device, an MHL device, or an incorrectly connected USB connection (in which an MHL cable is incorrectly plugged into a USB port of a non-MHL device).

A protocol related to source device 105 often will include a discovery process to be followed when devices are connected. For example, MHL protocol includes a discovery sequence for the connection of an MHL sink device and source device. However, the discovery sequence requires the operation of the MHL mobile device, which will not be possible if the MHL mobile device is running battery power and the battery is discharged to a level that is too low to run the device. In some embodiments, Device A provides for determination of the type of device Source Device 105 is without the Source Device having sufficient power to complete the discovery process for MHL. In some embodiment, upon discovering that the Source Device is an MHL compatible device, Device A 115 provides power to a pin of the connector 130 to charge the battery of Device A 115.

Figure 2:
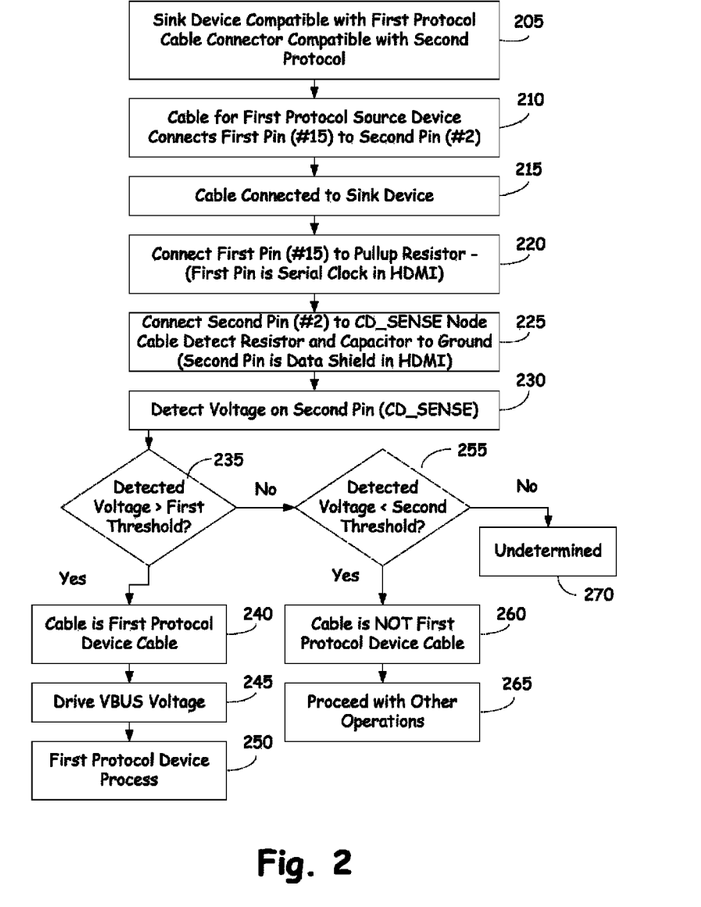
FIG. 2 is a flowchart to illustrate an embodiment of a process for detection of a cable connection.

FIG. 2 is a flowchart to illustrate an embodiment of a process for detection of a cable connection. In some embodiments, a sink device is compatible with a first protocol, such as, for example, MHL, with the sink device including a cable connector that is compatible with a second protocol, such as HDMI 205. In some embodiments, the sink device may be a device that is compatible with multiple protocols, such as MHL and HDMI. In some embodiments, a cable for the first protocol may include a connector plug for the second protocol, such as a cable for a connection between an MHL source device and an MHL sink device that utilizes an HDMI connector. In some embodiments, the cable includes a resistance between a first pin and a second pin of the connector plug 210, where such pins are not used for transport of signals between the source device and the sink device. In an example, the connection may be between a #15 pin and a #2 pin of an HDMI connector. In some embodiments, the resistive connection between the first pin and the second pin may be utilized in the detection of the cable connection by a sink device.

Figure 3:
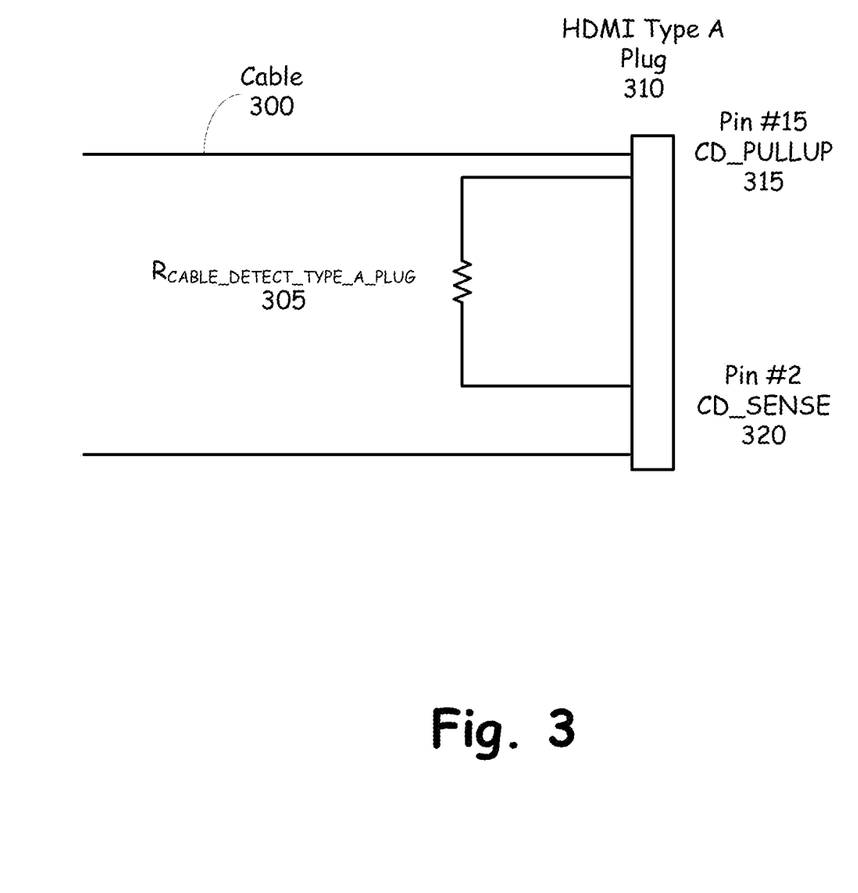
FIG. 3 illustrates an embodiment of a cable for connection of devices.
Figure 4:
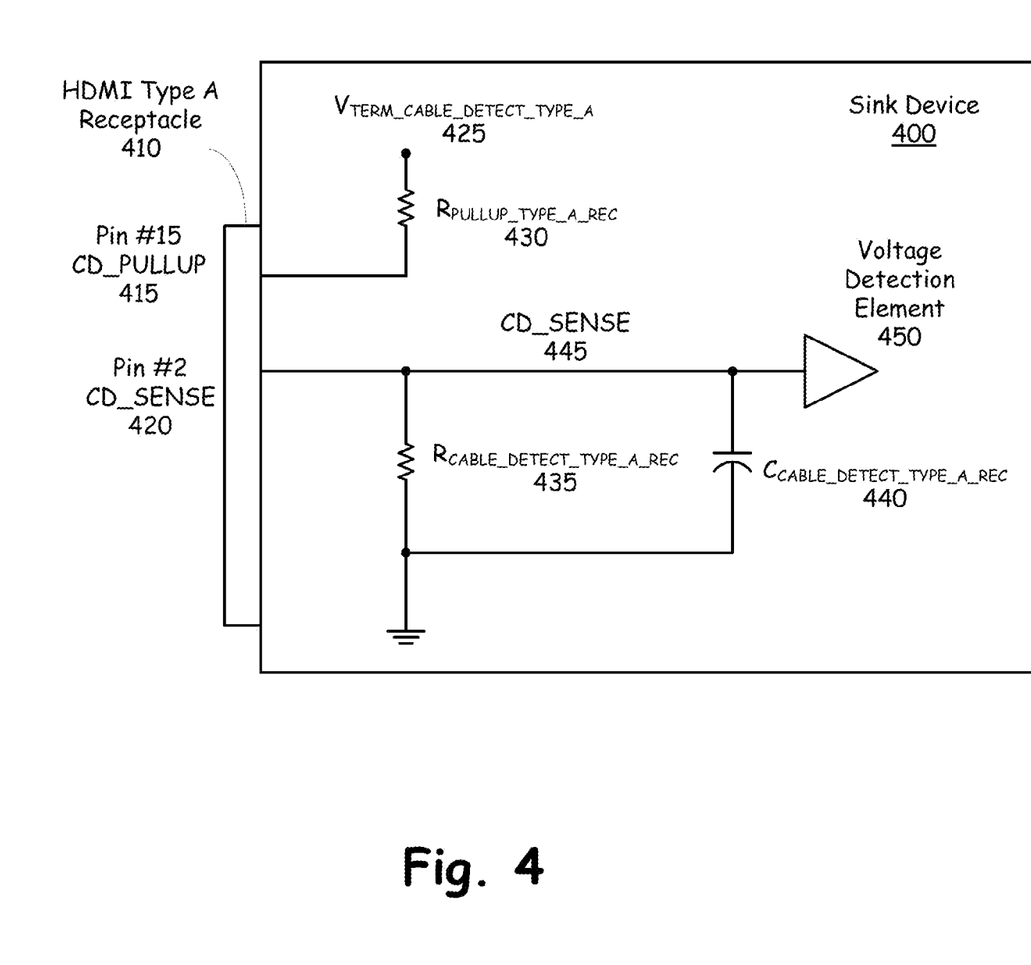
FIG. 4 illustrates an embodiment of a sink device to detect cable connections.

In some embodiments, a cable may be connected to the sink device via the connector of the sink device 215. Upon receiving such cable, the sink device is not initially aware of the type of device that may be connected to the sink device via the cable. As illustrated in FIG. 3, the cable includes a connection between the first and second pins. In some embodiments, the connection of the cable to the sink device results in the first pin of the connector being connected to a pull-up resistor 220. In some embodiments, the pull-up resistor of a certain value may be required for a connection in the second protocol, such a clock data pin connection having a pull-up resistor with a typical value of 47 KΩ. In some embodiments, the connection of the cable to the sink device results in the second pin of the connector being connected a sensing node designated herein as CD_SENSE (Cable Detect Sensing) 225, which may include a pull-down resistor and pull-down capacitor tied to ground, as illustrated in FIG. 4. In some embodiments, the second pin is not used for data transmission in the second protocol, such as, for example, a shield pin in the second protocol (a TMDS (Transition Minimized Differential Signaling) data shield in HDMI), and thus is available for modification for cable detection use.

In some embodiments, the sink device operates to detect a voltage on the second pin 230. In some embodiments, if the detected voltage is greater than a first threshold 235, where the voltage is indicative of voltage drop generated by the current path made possible by the connection of the cable and the linking of the first and second pins, then the sink device determines that the cable is a first protocol device cable 240, such as an MHL cable, and the sink device operates consistently with discovery of a device under the first protocol, such as driving a voltage on a bus (VBUS) 245 and continuing with first protocol device process 250. In some embodiments, if the voltage is not greater than the first threshold 235 and is less than a second threshold 255, then the cable is not a first protocol device cable 260, and the process may proceed with other operations under a different protocol 265. In some embodiments, the sink device may proceed with other operations, such as, for example, one or more processes for a second protocol device, such as an HDMI device. If the voltage falls between the thresholds, then the result may be undetermined 270.

FIG. 3 illustrates an embodiment of a cable for connection of device. In some embodiments, a cable 300 for a first protocol may include a connector 310 (such as connector plug) that is compatible with a second protocol, such as, for example, an MHL cable including an HDMI Type A plug 310, thereby allowing for connection with an MHL sink having an HDMI connector receptacle. In some embodiments, the cable 300 includes a resistance ($R_{CABLE\_DETECT\_TYPE\_A\_PLUG}$) 305 that operates to link two of a plurality of pins, such as a first pin and a second pin, of the connector plug together. In an example of an HDMI Type A plug, the first pin 315 may be Pin #15 of the connector, where such pin will be linked to a pull-up element (CD_PULLUP) when connected to an MHL sink device; and the second pin 320 may be Pin #2 of the connector, where such pin will be connected to a voltage sensing node (CD_SENSE) when connected to an MHL sink device.

In some embodiments, a sink device may further use a value of the resistance 305 in identification of the cable. In one example, a first cable may utilize a first resistance (such as 3.3 kΩ), while another version of a cable, such as a later cable with an improved feature set, may utilize a second resistance (such as 4.3 kΩ). In some embodiments, a sink device may utilize the detected resistance to determine the type of cable and thus the features of an attached cable.

FIG. 4 illustrates an embodiment of a sink device to detect cable connections. In some embodiments, a sink device 400 compatible with a first, such as an MHL sink device, includes a connector (such as a receptacle for a plug) 410, such as, for example, an HDMI Type A receptacle. The connector 410 receives a plurality of pin connections, including a first pin 415 (which may be Pin #15 of the connector for CD_PULLUP) and a second pin 420 (which may be Pin #2 of the connector for CD_SENSE). In some embodiments, the first pin 415 of the connector 410 is coupled with a first end of a pull-up resistor 430 ($R_{PULLUP\_TYPE\_A\_REC}$), where a second end of the pull-up resistor 430 is coupled with a voltage potential 425 ($V_{TERM\_CABLE\_DETECT\_TYPE\_A}$). In some embodiments, the second pin 420 of the connector 410 is coupled with a sense node 445 (CD_SENSE) for sensing of a voltage potential in order to determine the connection of a cable. In some embodiments, the sink device 400 further includes a pull-down resistor 435 ($R_{CABLE\_DETECT\_TYPE\_A\_REC}$) and pull-down capacitor 440 ($C_{CABLE\_DETECT\_TYPE\_A\_REC}$), where a first end of the resistor 435 and the capacitor 440 are coupled with the sense node 445 and a second end of the resistor and capacitor are coupled to ground. In some embodiments, the capacitor provides a path to ground for AC (alternating current) signals for second protocol (HDMI) operation, while there is a high impedance path to ground for sensing for a first protocol cable. In some embodiments, the sink device 400 includes a voltage detection element 450 to detect the voltage potential on the sense node 445, where the voltage detection element may be any known mechanism for the detection of a voltage. In the first protocol (MHL) the pull-down resistor provides a voltage drop, where a value of the pull-down resistor is provided such that in series with the pull-up resistor (which as a set value in HDMI specification) to provide a detectable logic voltage value a In some embodiments, if a voltage at the sense node is greater than a certain threshold voltage, then a connection to a first protocol cable at the receptacle is detected, and the sink device may proceed with operations for the first protocol, including discovery of a connected device. In some embodiments, the values of the resistors 430 and 435 are selected, together with the value of a resistance of a connector, are utilized to generate one or more voltages at the sense node 445.

In some embodiments, the HDMI Type A connector is utilized to connect with a receptacle. In some embodiments, a MHL Sink uses a receptacle to connect to an upstream source device via an MHL Cable. In some embodiments, the sink is responsible for managing the detection of the proper mode or proper cable, and protecting the pins and contacts from damage during that detection process. In some embodiments, a MHL sink is operable such it does not drive signal levels onto the MHL+, MHL− or CBUS signal pins, and does drive any voltage on VBUS, in a manner that may damage a non-MHL device connected to this receptacle.

Figure 5A:
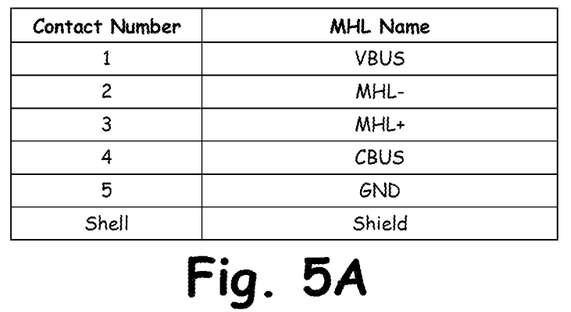
FIG. 5A is an illustration of pins for a cable connection to a source device in an embodiment of a system.

FIG. 5A is an illustration of pins for a cable connection to a source device in an embodiment of a system. In some embodiments, a cable provides certain connections for a first protocol, such as MHL. In some embodiments, connections may be for a Micro USB connection to an MHL device.

Pursuant to the MHL protocol requirements, the connections include five wire connections, such connections being a voltage bus (VBUS) for providing a voltage to an MHL, data lines (MHL− and MHL+), a control bus (CBUS), and a ground connection (GND), in addition to a shield connection (linked to a cable shell). The USB signal names associated with the contact numbers in FIG. 5A may be found in the "Universal Serial Bus Micro-USB Cables and Connectors Specification, Revision 1.01" (April 2007).

Figure 5B:
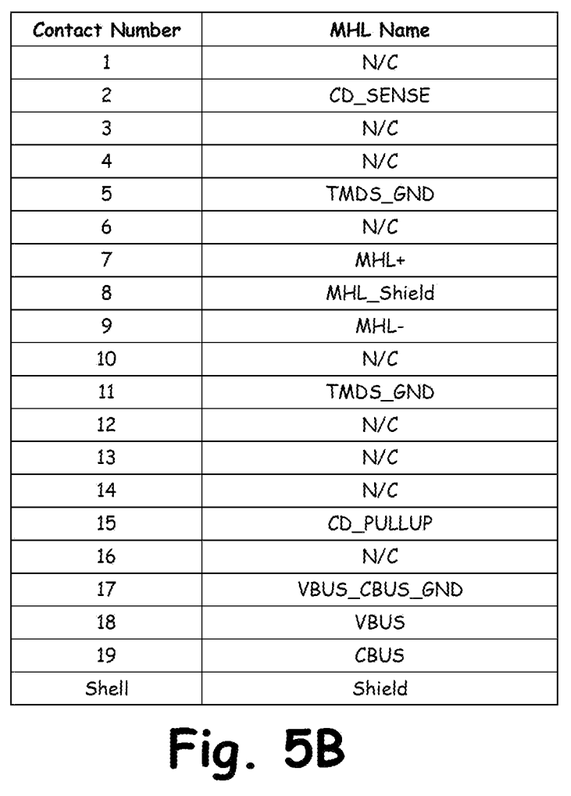
FIG. 5B is an illustration of pins for a cable connection to a sink device in an embodiment of a system.

FIG. 5B is an illustration of pins for a cable connection to a sink device in an embodiment of a system. In some embodiments, a cable providing the connections illustrated in FIG. 5A for a source device provides pin connections in a second protocol compatible connector, such as an HDMI connector, for a CD_SENSE node and a CD_PULLUP connection for detection of a cable connection. In some embodiments, the CD_SENSE node and a CD_PULLUP are coupled via a resistance, and are not linked to a source device. The pin connections for cable detection in addition to connections related to the first protocol, such as MHL related connections for a MHL+, MHL−, and TMDS ground for data transmission; a voltage bus (VBUS) and control bus (CBUS) with a VBUS and CBUS ground; and shield (cable shell) and MHL shield connections. "N/C" indicates a pin that is not used by MHL and is not connected to any other signal or level in the sink end of the MHL cable.

In some embodiments, a connector for connection of a first communication standard to a second communication standard, such as a connection between MHL and HDMI, utilizing the mapping of the connection from the first communication standard to the second communication standard. In some embodiments, a connector such as an HDMI Type A connector (which may be either a plug or receptacle connector element), includes the mapping of the five MHL connections provide in FIG. 5A to the contact numbers for the HDMI type A connector as shown in FIG. 5B.

In some embodiments, MHL_Shield, TMDS_GND and VBUS_CBUS_GND may be connected at the system level to a ground signal defined in the MHL Specification. In some embodiments, MHL_Shield is intended to be closely associated with the MHL+ and MHL− signals and VBUS_CBUS_GND is intended to be closely associated with the VBUS and CBUS pins in order to meet electrical requirements of the MHL Specification.

Figure 6A:
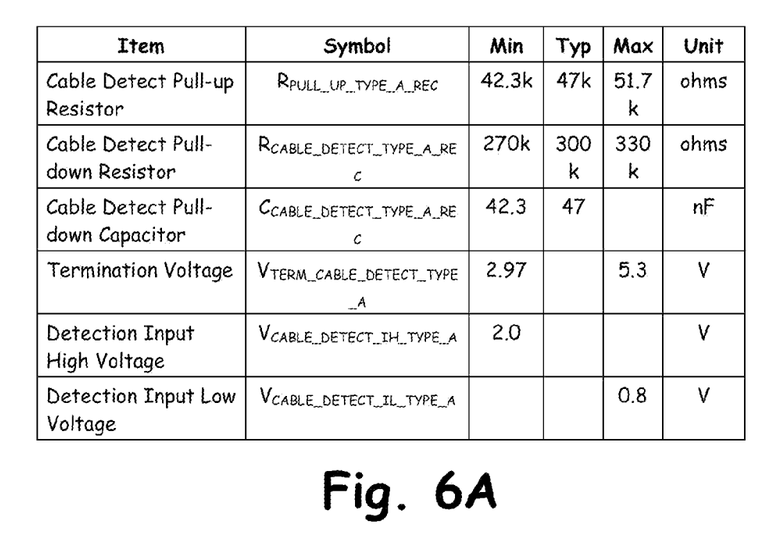
FIG. 6A is an illustration of parameters for an embodiment of a sink device to detect cable connections.
Figure 6B:
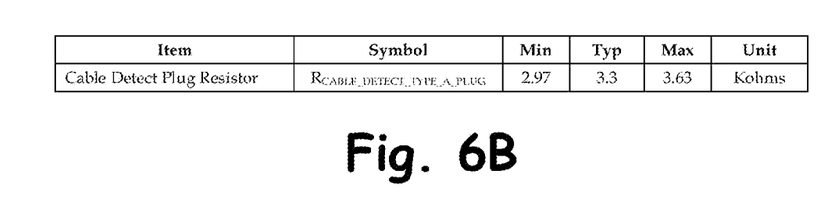
FIG. 6B is an illustration of a parameter for an embodiment of a cable for connection of a source device to a sink device.

FIG. 6A is an illustration of parameters for an embodiment of a sink device to detect cable connections. FIG. 6B is an illustration of a parameter for an embodiment of a cable for connection of a source device to a sink device. As provided in FIG. 6A, in some embodiments, a cable detect pull-up resistor (such as resistor 430 in FIG. 4) has a typical resistance of 47 KΩ; a cable detect pull-down resistor (resistor 435 in FIG. 4) has a typical resistance of 300 KΩ; a cable detect pull-down capacitor (capacitor 440 in FIG. 4) has a typical capacitance of 47 nF. As provided in FIG. 6B, a cable detection plug resistor (resistor 305 in FIG. 3) has a smaller typical resistance of 3.3 KΩ, where such resistance is small enough to have a minor effect on the voltage values developed by the elements of the sink device, but is a sufficient resistance to protect a circuit if a connection between a voltage and ground is generated by an improper connection to the cable.

In some embodiments, utilizing the cable pull-up and pull-down elements in connection with the resistance of the cable the CD_PULLUP and CD_SENSE pins, a voltage may be sensed at the CD_SENSE node. In some embodiments, if the voltage is higher than a threshold such as the detection input high voltage of 2.0 volts, then the sink device may determine that a first protocol cable is connected to the sink device. In some embodiments, if the voltage is less than a threshold such as the detection input low voltage of 0.8 volts, then the sink device may determine that a first protocol cable is not connected to the sink device. In some embodiments, a voltage between such values may be an indeterminate result.

Figure 7:
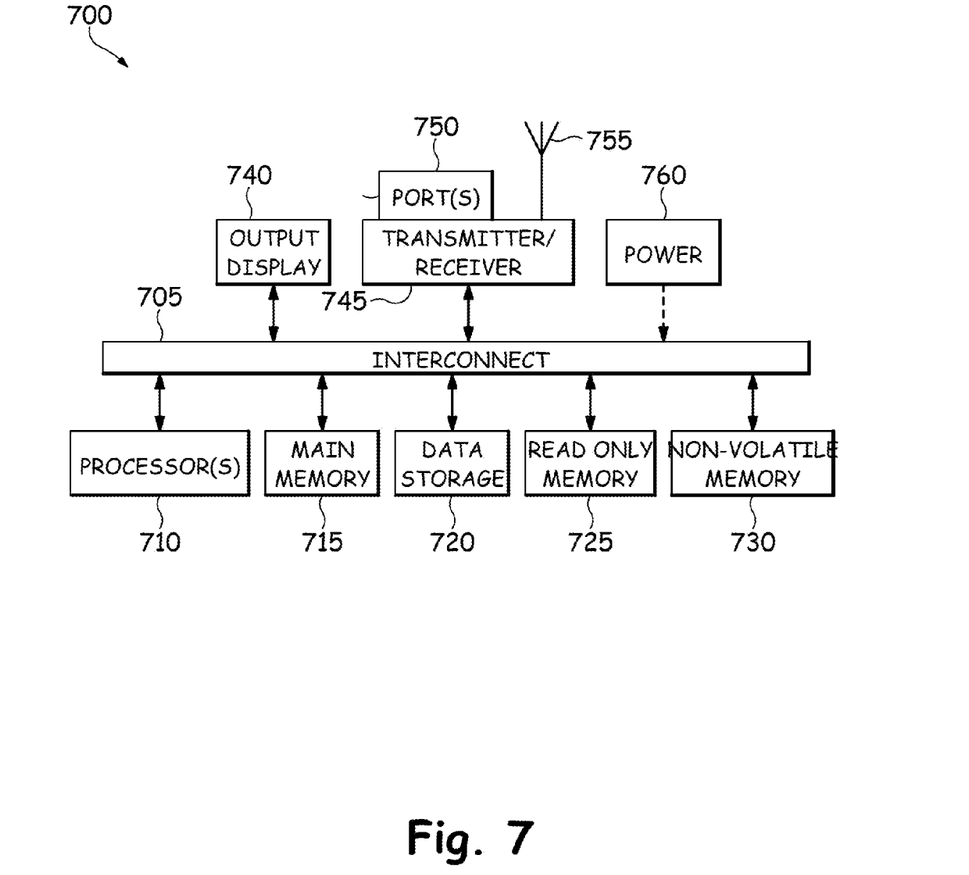
FIG. 7 illustrates an embodiment of an electronic device.

FIG. 7 illustrates an embodiment of an electronic device. In this illustration, certain standard and well-known components that are not germane to the present description are not shown. In some embodiments, a device 700 may be a sink device compatible with a first protocol, such as an MHL sink device, that may receive a cable connection from another device. In some embodiments, the device 700 may be a source device connected via cable to a device.

Under some embodiments, the device 700 comprises an interconnect or crossbar 705 or other communication means for transmission of data. The data may include various types of data, including, for example, audio-visual data and related control data. The device 700 may include a processing means such as one or more processors 710 coupled with the interconnect 805 for processing information. The processors 710 may comprise one or more physical processors and one or more logical processors. Further, each of the processors 710 may include multiple processor cores. The interconnect 705 is illustrated as a single interconnect for simplicity, but may represent multiple different interconnects or buses and the component connections to such interconnects may vary. The interconnect 705 shown in FIG. 7 is an abstraction that represents any one or more separate physical buses, point-to-point connections, or both connected by appropriate bridges, adapters, or controllers. The interconnect 705 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 800 further comprises a random access memory (RAM) or other dynamic storage device as a main memory 715 for storing information and instructions to be executed by the processors 710. Main memory 715 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 700 also may comprise a read only memory (ROM) 725 or other static storage device for storing static information and instructions for the processors 710. The device 700 may include one or more non-volatile memory elements 730 for the storage of certain elements.

Data storage 720 may also be coupled to the interconnect 705 of the device 700 for storing information and instructions. The data storage 720 may include a magnetic disk or other memory device. Such elements may be combined together or may be separate components, and utilize parts of other elements of the device 700.

The device 700 may also be coupled via the interconnect 705 to an output display or presentation device 740. In some embodiments, the display 740 may include a liquid crystal display (LCD), plasma display, or any other display technology for displaying information or content to an end user. In some environments, the display 740 may include a touchscreen that is also utilized as at least a part of an input device. In some environments, the display 740 may be or may include an audio device, such as a speaker for providing audio information, including the audio portion of a television program.

One or more transmitters or receivers 745 may also be coupled to the interconnect 705. In some embodiments, the device 700 may include one or more ports 750 for the reception or transmission of data. In some embodiments, at least one port may utilize a connector (such as a receptacle for a cable plug) compatible with a second protocol, such an HDMI compatible connector. In some embodiments, the device 700 operates to detect a cable connection for a first protocol device by the detection of a certain voltage at a sense pin of the connector, such as a voltage that is above a certain threshold.

The device 700 may further include one or more antennas 755 for the reception of data via radio signals. The device 700 may also comprise a power device or system 760, which may comprise a power supply, a battery, a solar cell, a fuel cell, or other system or device for providing or generating power. The power provided by the power device or system 760 may be distributed as required to elements of the device 700.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. An apparatus comprising:
a port for the connection of a first end of a cable, the port being compatible with a first protocol and a second protocol, the port including a connector for the second protocol, the port including a plurality of pins including a first pin, a second pin, and a power pin;
a pull-up resistor coupled between the first pin and a voltage source, wherein the pull-up resistor is a resistor required for the second protocol;
a pull-down resistor coupled between the second pin and ground; and
a voltage detection element coupled with the second pin;
wherein the apparatus is to determine that a cable compatible with the first protocol is connected to the port if the voltage detection element detects a voltage above a first threshold, wherein a cable compatible with the first protocol includes a resistor linking the first pin and the second pin together; and
wherein the first protocol includes a discovery sequence between connected devices, and wherein the apparatus is to supply a voltage on the power pin upon determining based upon the voltage detected by the voltage detection element that a cable compatible with the first protocol is connected to the connector without requiring a successful discovery sequence for the apparatus and a connected device.

2. The apparatus of claim 1, wherein the apparatus is to determine that a cable compatible with the first protocol is not connected to the port if the voltage detection element detects a voltage below a second threshold, the second threshold being lower than the first threshold.

3. The apparatus of claim 1, wherein the first protocol is MHL (Mobile High-Definition Link) and the second protocol is HDMI (High Definition Multimedia Interface).

4. The apparatus of claim 1, further comprising a pull-down capacitor coupled between the second pin and ground.

5. The apparatus of claim 1, wherein the apparatus is a device that is compatible with data transfer in the first protocol and in the second protocol.

6. The apparatus of claim 1, wherein the apparatus is further to detect a type of cable of a plurality of types of cables compatible with the first protocol based on a resistance value of the cable.

7. A system comprising:
a sink device that is compatible with a first protocol and a second protocol, the sink device including:
a port having a connector for the second protocol, the port including a plurality of pins including a first pin, a second pin, and a power pin,
a pull-up resistor coupled between the first pin and a voltage source, wherein the pull-up resistor is a resistor required for the second protocol,
a pull-down resistor coupled between the second pin and ground, and
a voltage detection element coupled with the second pin; and
a cable with a first end and a second end coupled with the sink device, the cable including a connector for the second protocol attached to the first end of the cable, the connector including a first pin to connect with the first pin of the port and a second pin to connect with the second pin of the port, wherein a cable compatible with the first protocol includes a resistor linking the first pin of the cable connector and the second pin of the cable connector together;
wherein the sink device is to determine that the cable is compatible with the first protocol if the voltage detection element detects a voltage above a first threshold; and
wherein the first protocol includes a discovery sequence between connected devices, and wherein the sink device is to supply a voltage on the power pin upon determining based upon the voltage detected by the voltage detection element that a cable compatible with the first protocol is connected to the connector without requiring a successful discovery sequence for the sink device and a connected device.

8. The system of claim 7, wherein the first protocol is MHL (Mobile High-Definition Link) and the second protocol is HDMI (High Definition Multimedia Interface).

9. The system of claim 7, wherein the cable includes a second connector at the second end of the cable, and wherein the first pin and the second pin are not connected to any pins of the second connector for a cable compatible with the first protocol.

10. The system of claim 9, further comprising a source device coupled with the second connector, wherein the source device is compatible with the first protocol or the second protocol.

11. The system of claim 7, wherein the resistor of a cable compatible with the first protocol has a resistance that is smaller than a resistance of the pull-up resistor or the pull-down resistor.

12. The system of claim 7, further comprising a pull-down capacitor coupled between the second pin and ground, the pull-down capacitor proving a path for AC (alternating current) signals to ground.

13. The system of claim 7, wherein the sink device is to determine that the cable is not compatible with the first protocol if the voltage detection element detects a voltage below a second threshold voltage, the second threshold voltage being lower than the first threshold voltage.

14. The system of claim 7, wherein the sink device is further to detect a type of cable of a plurality of types of cables compatible with the first protocol based on a resistance value of the cable.

15. A method comprising:
receiving a cable at a connector of a device;
connecting the first pin of the connector of the device to a first end of a pull-up resistor, a second end of the pull-up resistor being coupled with a voltage source, the device being compatible with a first protocol and a second protocol, the pull-up resistor being required for the second protocol, wherein a cable compatible with the first protocol includes a resistor linking a first pin and a second pin of the connector together;
connecting the second pin of the connector of the device to a first end of a pull-down resistor and a node, a second end of the pull-down resistor being coupled with ground;
detecting a voltage on the node; and
determining by the device that a cable compatible with the first protocol is coupled with the connector if the detected voltage is above a threshold voltage;
wherein the first protocol includes a discovery sequence between connected devices, and wherein the apparatus is to supply a voltage on the power pin upon determining based upon the voltage detected by the voltage detection element that a cable compatible with the first protocol is connected to the connector without requiring a successful discovery sequence between the device and a second connected device.

16. The method of claim 15, further comprising determining that a cable compatible with the first protocol is not connected with the connector if the voltage detection element detects a voltage on the node that is below a second threshold, the second threshold being lower than the first threshold.

17. The method of claim 15, wherein the first protocol is MHL (Mobile High-Definition Link) and the second protocol is HDMI (High Definition Multimedia Interface).

18. The method of claim 15, further comprising connecting the second pin of the connector of the device with a first end of a pull-down capacitor, a second end of the pull-down capacitor being coupled with ground.

19. The method of claim 15, further comprising detecting a type of cable of a plurality of types of cables compatible with the first protocol based on a resistance value of the cable.

20. The apparatus of claim 1, wherein for the second protocol a voltage is received on the power pin in a reverse direction from the supplying of the voltage on the power pin by the apparatus according to the first protocol.

21. The system of claim 7, wherein for the second protocol a voltage is received on the power pin in a reverse direction from the supplying of the voltage on the power pin by the source device according to the first protocol.

22. The method of claim 15, further comprising receiving a voltage on the power pin according to the second protocol in a reverse direction from the supplying of the voltage on the power pin by the source device according to the first protocol.

* * * * *